Patented Oct. 15, 1946

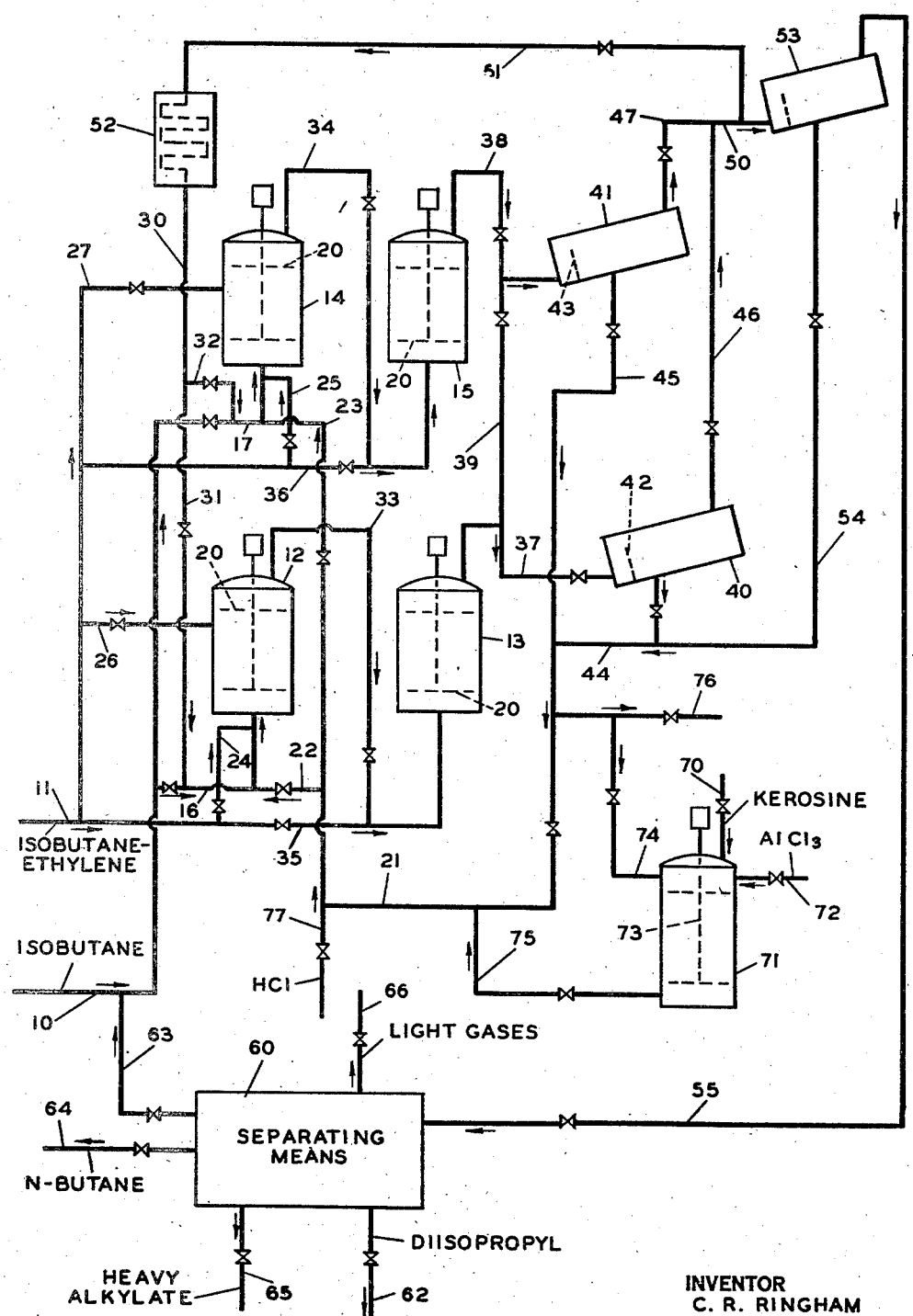

2,409,389

UNITED STATES PATENT OFFICE 2,409,389

ALKYLATION PROCESS

Clarence R. Ringham, Oklahoma City, Okla., assignor to Phillips Petroleum Company, a corporation of Delaware Application September 28, 1944, Serial No. 556,208

3 Claims. (Cl. 260—683.4)

This invention relates to the conversion of hydrocarbons in the presence of aluminum halide catalysts. In particular embodiments it relates to alkylation of alkylatable hydrocarbons by reaction with alkylating reactants in the presence of liquid hydrocarbon-aluminum halide complexes as catalysts. In one specific embodiment it relates to the reaction of isobutane and ethylene to produce diisopropyl.

Aluminum halide catalysts have been used in numerous processes for the conversion of hydrocarbons, including decomposition or cracking of high-boiling hydrocarbons, isomerization of low-boiling hydrocarbons, and alkylation of alkylatable hydrocarbons, including both isoparaffins, normal paraffins, cycloparaffins, and aromatic hydrocarbons. In such processes these catalysts have been used as such, suspended in or dissolved in a reaction mixture, suspended on solid supports such as active carbon, Activated Alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched normally liquid paraffin hydrocarbons boiling in the boiling ranges of those fractions generally identified as gasoline and kerosene. In many instances it is desirable to have present a small amount of a hydrogen halide, sometimes only about 0.1 to about 1 to 5 per cent by weight. This material may be present as a result of side reactions, such as when water is present in a charge stock, when an organic halogen compound is present in a charge stock, when some interreaction between the aluminum halide and hydrocarbon takes place, or when a hydrogen halide is deliberately added. Since it is substantially impossible to effect complete dehydration of all equipment and materials, especially in a commercial process, conversions with aluminum halide catalysts are often conducted without the knowledge or appreciation that minor amounts of a hydrogen halide are present.

As alkylating reactants for use in alkylation processes for reaction with alkylatable hydrocarbons low-boiling olefins are generally used. However, other alkylating reactants have also been proposed such as alkyl halides and alcohols. Often the products of the alkylation will not result from structural addition of the alkylating reactant to the alkylatable hydrocarbon. Thus, when isobutane is reacted with ethylene in the presence of aluminum halide catalysts one of the major products is diisopropyl, although structurally this product is not "ethyl isobutane" even though it is a hexane. However, in many instances structural addition products are obtained, as when ethylene reacts with benzene to form ethylbenzene or when isopropyl alcohol or an isopropyl halide reacts with benzene to form isopropylbenzene.

The commercial practice of such alkylation processes presents numerous problems which are not found in laboratory operation and which often cannot be foreseen on the basis of results obtained in laboratory runs. One of the greatest difficulties experienced in commercial operations is the efficient use of equipment while securing, at the same time, uniform operation over an extended period of time. It is particularly important to have uniform catalyst activity during an extended period of operation, such as one lasting for several weeks, in order that uniform volumes of materials may be treated and uniform reaction effluents may be available for treatment in separating equipment having a fixed size and operated at maximum efficiency. I have found that an aluminum halide-hydrocarbon complex may be used as a catalyst in commercial operations for the alkylation of hydrocarbons and satisfactorily uniform catalyst activity may be established and maintained, and at the same time a number of relatively small reactors may be used to treat large quantities of material, by the specific method of combining groups of reactors and catalyst settlers, and by combining all of the used catalyst before it is returned back to the individual reactors, in a manner which will be more fully and completely disclosed in connection with the accompanying drawing.

An object of this invention is to convert hydrocarbons in the presence of a hydrocarbon-aluminum halide complex catalyst.

Another object of this invention is to effect an alkylation reaction between an alkylatable hydrocarbon and an alkylating reactant in a continuous commercial process.

Still another object of this invention is to obtain uniform reaction in an alkylation process while at the same time using a large number of relatively small reactors.

Still another object of this invention is to react isobutane and ethylene to produce high yields of diisopropyl.

Other objects and advantages of this invention will become apparent, to one skilled in the art, from the accompanying disclosure and discussion.

A preferred embodiment of my invention will now be discussed in some detail in connection with the accompanying drawing which forms a part of this application, and which shows an arrangement of apparatus suitable for practicing the invention. While various features of the invention will be discussed in connection with the reaction of isobutane and ethylene to produce diisopropyl in the presence of a liquid aluminum chloride-hydrocarbon complex as the catalyst, it is to be understood that the invention can be applied to other reactants and to other liquid catalysts.

Referring now to the drawing, an isobutane stream is passed to the process through pipe 10 and a mixture of isobutane and ethylene is passed to the process through pipe 11. As will be appreciated by those skilled in the art in a commercial plant these hydrocarbons will be accompanied by comparatively small amounts of other hydrocarbons. Such hydrocarbons, however, should be present in relatively small amounts, particularly when they are also reactive under the reaction conditions. One rather typical composition for each of these streams will be presented in the specific example given hereinafter. The alkylation reaction is conducted in four reactors—12, 13, 14, and 15—with reactors 12 and 13 being operated in series and reactors 14 and 15 being operated in series, the first said set of reactors being operated in parallel to the second set of reactors. More than two such sets of reactors may, of course, be used if desired. Contents of each reactor are intimately admixed by means of a stirrer 20. The isobutane stream is passed through pipes 16 and 17 in two portions to the bottom of each of reactors 12 and 14, which are the primary reactors in each set. A catalyst stream from a common catalyst source, such as pipe 21, is passed in two portions through pipes 22 and 23 to the bottoms of reactors 12 and 14. This catalyst stream comprises used and fresh catalyst as will be more thoroughly discussed hereinafter. The isobutane-ethylene stream is split into six portions. To the bottom of each of the primary reactors 12 and 14 is added one of these portions through pipes 24 and 25. To the middle of each of the two primary reactors 12 and 14 is added another portion through pipe 26 and 27. A recycled portion of the hydrocarbon effluents of the reaction is passed through pipe 30 and divided into two portions which are passed through pipes 31 and 32, each portion also being added to the bottom of the primary reactors 12 and 14.

A preferred reaction temperature for this conversion is between about 50 and about 200° F., preferably about 80 to about 150° F. When alkylating hydrocarbons the activity of the catalyst herein described is sufficiently high that even ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl I prefer to operate at flow rates between about 0.2 and about 1.5 gallons of total alkylate produced per gallon of catalyst present in the reactor per hour. Thus, when reacting isobutane and ethylene in a reactor having a total internal volume of 1,000 gallons and with a hydrocarbon to catalyst ratio within the reactor of 3:2 and a flow rate of 1.25 gallons of alkylate per gallon of catalyst per hour, the flow rate of alkylate should be such that 500 gallons of alkylate are produced per hour.

The catalyst itself is substantially insoluble in hydrocarbons and hydrocarbons are not substantially soluble in it. It is preferred to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions the hydrocarbon phase is the continuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory. Under such conditions it is quite difficult to obtain adequate physical separation between the hydrocarbon phase and the catalyst phase and a considerable amount of power is required in order to adequately mix hydrocarbons and catalyst charged to the reaction zone.

As the mixture of reactants and catalyst passes up through the primary reactors it is thoroughly admixed so that the catalyst is present in extremely small particles. From the top of each of the primary reactors this intimate admixture is passed, through pipes 33 and 34, to the bottom of the corresponding secondary reactor. At this point the final two portions of the isobutane-ethylene mixture are added, through pipes 35 and 36. The hydrocarbon-catalyst mixture is also intimately admixed in the secondary reactors 13 and 15 to effect suitable reaction. The resulting admixtures are passed through pipes 37 and 38 to corresponding primary settlers 40 and 41. These settlers are preferably vessels set on a slope with a solid baffle plate 42 and 43 near the inlet and extending about halfway up in the tank. This baffle plate serves to distribute the incoming emulsion across the tank section, thereby tending to reduce the short-circuiting effect, and also serves as a retainer wall for the catalyst which settles out. The liquid catalyst which settles out is removed through pipes 44 and 45 and combined to form a common catalyst source in pipe 21. A pipe 39 is provided joining effluent pipes 37 and 38 for use in case of emergency if one of the settling tanks 40 or 41 needs to be taken out of service. Ordinarily this pipe 39 will not be used.

From the top part of settling tanks 40 and 41 a hydrocarbon mixture is passed through pipes 46 and 47 and is combined in pipe 50. A substantial portion of this combined hydrocarbon material is passed through pipe 51 to cooler 52 and is returned to the reactors through pipe 30 as previously discussed. Since this combined hydrocarbon material still contains a small amount of entrained catalyst, generally, however, not more than about two or three to about eight or ten per cent of the total catalyst, the remaining portion is passed to a secondary settler 53. Since the catalyst which is still present in the hydrocarbon material is quite finely divided and represents the finely divided particles present in the emulsion passed from the secondary reactors through pipes 37 and 38, a somewhat longer settling time is necessary in settler 53 than was used in either settlers 40 or 41. Catalyst which separates out is passed through pipe 54 for admixture with the catalyst removed through pipes 44 and 45.

A liquid hydrocarbon material substantially free from catalyst and containing unreacted hydrocarbons and alkylate is passed from settler 53 through pipe 55 to separating means 60. Generally it will be desirable to wash this hydrocarbon material with an alkaline solution, to remove any acidic materials which may be present, before the material is subjected to fractional distillation. A diisopropyl fraction is separated and removed through pipe 62 as a product of the process. Unreacted isobutane is separated and returned to the process through pipe 63. Normal butane, which will include that initially accompanying the charge stock and any normal butane formed by isomerization during the alkylation process, may be separated and discharged through pipe 64. One or more other alkylate fraction may also be recovered, as through pipe 65. Any undesired light gases may be discharged through pipe 66.

Aluminum chloride is the halide which will most generally be used in the practice of my invention although it is not outside of the broadest concepts of my invention to use other aluminum halides, particularly aluminum bromide. While aluminum fluoride generally does not give satisfactory results, mixed halides such as $AlCl_2F$, $AlClF_2$, $AlBr_2F$, and the like, may often be used successfully. Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 50 to about 70 per cent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosine. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. Two general types of catalyst have been prepared. These may be characterized as high-aluminum halide and low-aluminum halide types. When preparing a catalyst with aluminum chloride the high-aluminum chloride type contains 80 to 85 per cent by weight of aluminum chloride and is a yellow highly viscous material. The low-aluminum chloride type contains about 55 per cent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways, as by adding aluminum halide directly to recirculated catalyst or by dissolving aluminum halide in one of the streams charged to the reaction zone. The liquid complex should not be contaminated with water or other reactive, oxygen-containing compounds.

In making the original batch of catalyst kerosene or other hydrocarbon may be added through pipe 70 to a catalyst preparation vessel 71 and an aluminum halide such as aluminum chloride may be added through pipe 72. These materials may be intimately admixed by means of a stirring mechanism 73. After the process has been started the activity of the recirculated catalyst may be maintained by passing a portion of the recirculated catalyst through pipe 74 to vessel 71 wherein aluminum chloride, either as such or as a high-aluminum chloride complex such as previously discussed, may be intimately mixed with it. The resulting fortified catalyst is passed through pipe 75 and returned to pipe 21 wherein it is mixed with the recirculated catalyst. Since such treatment tends to increase the total volume of catalyst available it will generally be found necessary to maintain a desired volume of catalyst by withdrawal of material from pipe 74 through pipe 76. When it is desired to use a hydrogen halide in preparing the catalyst such material may be added through either of pipes 70 or 72. In such instances it is often not necessary to add hydrogen halide to the reaction system. However, if it is found desirable at any time to add a hydrogen halide to the reaction system, any desired portion may be added through pipe 77 to the catalyst present in pipe 21.

By maintaining total emulsification in all of the reactors in such a catalytic alkylation process, and allowing no settling of catalyst until the reactor effluents enter the settling tanks, the catalyst phase system has been consolidated into what may be considered a single control unit, inasmuch as the catalyst pumped back into the reactors from the settling tanks is uniform in composition. Therefore, the level of activity of the catalyst phase is the same, for all practical purposes, in all parts of the system at any given instant. Activity determinations may be made on catalyst sampled at any point in the catalyst recycle system, and this will establish definitely the condition of the catalyst in all parts of the system. Such an arrangement is markedly different from a system wherein each reactor and its settler are separate from the other reactors and settlers, or in which a settler is made integral with each reactor proper with allowance being made for return of the catalyst directly from the settler to the reactor. When any sample taken from the system shows the catalyst to be below the desired activity level, a predetermined quantity of the catalyst phase will be withdrawn from the catalyst recycle line, and an equivalent amount of fortified catalyst added at that point. Catalyst withdrawal and addition may be either a batch or a continuous process.

It will be appreciated that the drawing is a schematic representation of process flow, and of equipment which may be used in conducting my invention upon a commercial basis. Various specific pieces of equipment such as alkylation contactors, fractional distillation columns, pumps, control valves, heaters, coolers, catalyst chambers, and the like are well known to those skilled in the art and suitable equipment can be readily assembled for any specific application of my invention, by one so skilled, by following the teachings contained herein.

As an example of the operation of my invention, an isobutane feed stock is charged to the apparatus illustrated in the drawing through pipe 10. This stream has the composition shown in the accompanying table and is charged in a continuous stream in the amount indicated. An isobutane-ethylene mixture is prepared by using a liquid isobutane stream, from the same source as the isobutane feed, as an absorption liquid in a demethanizer to which is charged, as a gas, an effluent stream from a process for converting an ethane-propane mixture to ethylene. This isobutane-ethylene mixture has the composition shown in the table and is charged in the amount shown. The isobutane is split into two equal portions and the isobutane-ethylene stream is split into six equal portions. To the bottom of each of reactors 12 and 14 is passed one of the isobutane portions, one of the isobutane-ethylene portions, one-half of the recycle passing through pipe 30, and about 6,150 volumes per day of a liquid hydrocarbon-aluminum chloride complex catalyst from pipe 21. To the middle of each of the primary reactors 12 and 14 is charged another one of the six portions of the isobutane-ethylene portions. As the hydrocarbon-catalyst mixture passes upwardly through these reactors

|  | Isobutane feed pipe 10 | Isobutane-ethylene feed pipe 11 | Net effluent pipe 55 | Recycle pipe 51 |
|---|---|---|---|---|
| Volume/day | 6,363 | 3,318 | 9,156 | 140,000 |
| Comp., mol percent: | | | | |
| Methane and lighter | | 10.4 | 4.5 | |
| Ethylene | | 35.3 | 1.2 | |
| Ethane | | 13.2 | 5.7 | |
| Propylene | | 3.1 | 0.0 | |
| Propane | 5.6 | 2.9 | 5.3 | |
| Isobutane | 87.1 | 32.4 | 61.5 | |
| N. butane | 7.3 | 2.7 | 8.0 | |
| Diisopropyl | | | 8.6 | |
| Other $C_5$+ | | | 5.2 | |
|  | 100.0 | 100.0 | 100.0 | | it is intimately admixed by the efficient stirrer 20. The proportions of the materials charged insure that the liquid hydrocarbon mixture is in the continuous phase, with finely divided particles of the liquid catalyst complex, having a maximum particle diameter between about 10 and 20 microns, dispersed throughout. The reaction temperature ranges up to about 125° F. as a maximum, and the volume of cooled recycle is such that the overall temperature rise is not more than about 15 to 20° F. Under these conditions liquid phase operation is assured with a pressure not greater than about 400–420 pounds per square inch gage. From the top of each of the primary reactors, the reacting admixture passes to the bottom of the corresponding secondary reactors, 13 and 15, with one of the remaining two portions of the isobutane-ethylene charge being added just as it enters the secondary reactor. Each of the primary and secondary reactors has a capacity of about 72 volumes. The upflowing material is also intimately admixed in the secondary reactors, and passes from the top of each secondary reactor to a corresponding primary settling zone, having a sufficient size to provide a settling time of about 5 minutes, which is sufficient to permit removal of about 95 per cent of the dispersed catalyst. The resulting hydrocarbon mixtures are combined, and a major portion is cooled and recycled, in the amount shown in the table. The remaining portion of the combined mixtures passess to a secondary setling zone, which has a sufficient size to provide a settling time of about 30 minutes. The catalyst which settles out from each of the three settling zones is combined, a portion (about 14 volumes per day) is discharged from the system through pipe 76, another portion is passed to a catalyst make-up vessel 71, where it is fortified by the addition of fresh solid aluminum chloride. The resulting fortified catalyst is blended with the major part of the catalyst in pipe 21 to form a source of catalyst supply, with a uniform catalyst of high activity for the whole system. The hydrocarbon effluent from the secondary settler, in an amount shown in the table, is washed with aqueous sodium hydroxide and passed to separating means 60 for separation and recovery of various fractions. This net hydrocarbon effluent has the composition shown in the table. Except for a small amount of entrained catalyst, the hydrocarbon recycle passing through pipes 51 and 30 has the same composition.

It is to be appreciated that various modifications of my invention can be practiced without departing from the teachings and spirit of the disclosure, or from the scope of the claims. The claims are not to be unduly limited by limitations shown in the specific examples.

I claim:

1. An improved process for reacting ethylene and isobutane to form diisopropyl, which comprises conducting said reaction in two sets of reactors having two reactors in each set, passing a portion of an isobutane feed to the bottom of the first reactor of each set, passing a portion of an isobutane-ethylene feed to the bottom of each of said reactors and also to an intermediate point of the first reactor of each set, passing from a common catalyst source a portion of a liquid aluminum chloride-hydrocarbon complex catalyst to the bottom of the first reactor of each set in an amount not greater than that which will permit said catalyst to be the dispersed phase in the resulting admixture, maintaining an alkylation temperature in each said reactor, passing an intimate hydrocarbon-catalyst admixture from the top of the first reactor of each set to the bottom of the second reactor of the respective set, flowing the contents of each reactor from bottom to top and effecting a vigorous stirring of the contents of each said reactor to establish an intimate admixing of the contents thereof, passing the effluents of each second reactor to a corresponding primary settling zone to separate a liquid hydrocarbon material containing a minor amount of entrained catalyst from the bulk of the admixed catalyst, combining the hydrocarbon effluents of each primary settling zone and combining the catalyst effluents of each primary settling zone, passing at least a portion of said combined hydrocarbon effluents to a secondary settling zone wherein substantially all of the remaining entrained catalyst is separated from the effluents, removing from said secondary settling zone a hydrocarbon material and recovering therefrom a diisopropyl fraction as a product of the process, removing also from said secondary settling zone liquid catalyst, and combining said liquid catalyst with the aforesaid combined catalyst effluents to form a uniform catalytic material as the aforesaid common catalyst source.

2. In a process for reacting an alkylating reactant and an alkylatable hydrocarbon in the presence of a liquid alkylation catalyst under alkylation reaction conditions, the improvement which comprises conducting said reaction in at least two series of reactors having two reactors in each set, passing an alkylatable hydrocarbon feed to the bottom of the first reactor of each set, passing a mixture of alkylatable hydrocarbon and alkylating reactant to the bottom of each of said reactors and also to an intermediate point of the first reactor of each set, passing from a common catalyst source a portion of a liquid alkylation catalyst to the bottom of the first reactor of each set in an amount not greater than that which will permit said catalyst to be the dispersed phase in the resulting admixture, passing an intimate hydrocarbon-catalyst admixture from the top of the first reactor of each set to the bottom of the second reactor of the same set, flowing the contents of each reactor from bottom to top and effecting a vigorous and intimate mixing of the contents of each said reactor, passing the effluents of each second reactor to a corresponding primary settling zone to separate a liquid hydrocarbon material containing a minor amount of entrained catalyst from the bulk of the admixed liquid catalyst, combining the hydrocarbon effluents of each primary settling zone and combining the catalyst effluents of each primary settling zone, cooling a portion of said combined hydrocarbon effluents and passing same to the bottom of the first reactor of each said set, passing a further portion of said combined hydrocarbon effluents to a secondary settling zone and removing therein substantially all of said entrained catalyst from the hydrocarbon effluents, recovering an alkylate product from the resulting hydrocarbon effluents, admixing said separated catalyst with the aforesaid combined catalyst effluents to produce a common catalyst source as aforesaid, and adjusting the catalyst contained in said common catalyst source to maintain a desired catalytic activity by withdrawal of a portion thereof as spent catalyst and by addition of fresh catalytic constituents.

3. The process of claim 2 in which said alkylatable hydrocarbon is a low-boiling isoparaffin, said alkylating reactant is a low-boiling olefin, and said liquid catalyst is a liquid hydrocarbon-aluminum chloride complex.

CLARENCE R. RINGHAM.